(12) United States Patent
Weese et al.

(10) Patent No.: US 7,889,900 B2
(45) Date of Patent: Feb. 15, 2011

(54) MEDICAL IMAGE VIEWING PROTOCOLS

(75) Inventors: Juergen Weese, Aachen (DE); Eric Thelen, Aachen (DE); Gundolf Kiefer, Aachen (DE); Helko Lehmann, Aachen (DE); Ali Majidi, Aachen (DE); Jochen Peters, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 860 days.

(21) Appl. No.: 11/815,452

(22) PCT Filed: Feb. 7, 2006

(86) PCT No.: PCT/IB2006/050397
§ 371 (c)(1),
(2), (4) Date: Aug. 3, 2007

(87) PCT Pub. No.: WO2006/085266
PCT Pub. Date: Aug. 17, 2006

(65) Prior Publication Data
US 2010/0135543 A1   Jun. 3, 2010

(30) Foreign Application Priority Data
Feb. 8, 2005   (EP) .................................. 05300101

(51) Int. Cl.
*G06K 9/00* (2006.01)
*A61B 5/05* (2006.01)
(52) U.S. Cl. ..................... 382/128; 382/214; 600/413
(58) Field of Classification Search .............. 382/128, 382/129, 130, 131, 132, 133, 134, 154, 168, 382/172, 181, 189, 214, 232, 254, 255, 274, 382/276, 305, 312; 600/413, 431; 378/4, 378/21, 25
See application file for complete search history.

(56) References Cited

U.S. PATENT DOCUMENTS 7,477,768 B2 *   1/2009   Kaufman et al. ............ 382/128

(Continued)

FOREIGN PATENT DOCUMENTS

WO          9942977 A1      8/1999

(Continued)

OTHER PUBLICATIONS

Hunt G.W. et al "Automated Virtual Colonoscopy" Proceedings of the SPIE, vol. 3031, Feb. 1997.

(Continued)

*Primary Examiner*—Seyed Azarian

(57) ABSTRACT

A method, computer program and device for creating a viewing protocol for medical images is described. At least a first site of interest is identified in a medical imaging data set captured from the patient. Patient record data or computer assisted detection information can be used to identify the site of interest, which may be a potential lesion. A viewing protocol for displaying medical images to a user is planned. The viewing protocol includes a viewing path along which an image of the site of interest will be displayed. The viewing protocol also includes a trigger associated with the site of interest. When the trigger event is encountered the dynamic mode of image display is reconfigured to dynamically highlight the site of interest. The viewing protocol can then be used to control the display of images so as to provide, for example, a virtual endoscope.

11 Claims, 4 Drawing Sheets

U.S. PATENT DOCUMENTS

| | | | |
|---|---|---|---|
| 7,486,811 B2 * | 2/2009 | Kaufman et al. | 382/128 |
| 7,590,440 B2 * | 9/2009 | Lau et al. | 600/413 |
| 7,668,352 B2 * | 2/2010 | Tecotzky et al. | 382/128 |
| 7,738,683 B2 * | 6/2010 | Cahill et al. | 382/128 |
| 2001/0031920 A1 * | 10/2001 | Kaufman et al. | 600/431 |

FOREIGN PATENT DOCUMENTS

| | | |
|---|---|---|
| WO | 200032106 A1 | 6/2000 |
| WO | 2004034327 A2 | 4/2004 |

OTHER PUBLICATIONS

Vining D.J. et al "Virtual Colonoscopy with Computer-Assisted Polyp Detection" Computer Aided Diagnosis in Medical Imaging, Sep. 20, 1998.

Jolesz, Ferenc A. "Interactive Virtual Endoscopy" pp. 1-14. www.spl.harvard.edu.

"3-D Path Extraction for Virtual Endoscopy" math.lbl.gov, pp. 1-2. Oct. 14, 2004.

* cited by examiner

MEDICAL IMAGE VIEWING PROTOCOLS

The present invention relates to viewing three-dimensional medical imaging data sets, and in particular to configuring a viewing protocol to enhance the viewing of images including potential lesions or pathologies.

A number of techniques exist, such as computer tomography (CT) and magnetic resonance imaging (MR), for capturing multiple sectional images of the structure of the human body, giving rise to three dimensional (3D) data sets. Large 3D data sets can be inspected with a set of visualization tools, such as MPR (Multi-Planar Reconstruction), (slab) MIP (Medical Image Processing), DVR (Direct Volume Rendering), surface rendering, etc. However, inspection tends to be time consuming and strongly user dependent. Further, it can be difficult to ensure proper inspection of the complete set of image data.

These issues can be improved by using 3D viewing protocols, which automatically display a sequence, or animation, of different renderings (e.g. reformatted slices, (slab) MIP, surface rendering, DVR) of a 3D data set. The viewing protocol defines the type of renderings, rendering parameters (such as classification functions, colour lookup tables and magnification) and geometry. In addition the viewing protocol defines the sequence of renderings to be shown, the time for which a specific rendering is visible, as well as possible interactions available, or required, during data inspection.

The resulting renderings, defined by the viewing protocol, can then be displayed to a practitioner, such as a radiologist, for performing a diagnosis. A simple example is an animation provided by successively showing all image slices. Virtual colonoscopy, or virtual endoscopy in general, is a more refined example, and similar approaches have also been proposed for other areas such as neurology.

By way of example, WO 99/42977 describes a method for automatically planning a path through a 3d medical image data set for use in virtual endoscopy. A start and end point are identified and a path through a cavity of a body structure is calculated using a penalty function based on a number of factors, such as the width of the cavity, the curvature of the path and the distance from the path to the boundary of the cavity. The view displayed as the path is traversed can be changed using viewing parameters which can vary a number of properties defining the view along the planned path, such as illumination, angle of gaze, field of view size and aspect ratio.

Computer assisted detection (CAD) can be used to try and identify lesions or pathologies in body parts from 3d image data. However, typically CAD information is used in a binary approach in which a lesion or pathology is either present or not. Any identified lesion or pathology can be displayed in a different colour in a specific rendering showing the lesion or pathology. Alternatively, a list of identified lesions or pathologies can be compiled and used as a check list to guide a practitioner who can then inspect an image of each identified lesion or pathology. However, the identification of lesions or pathologies by CAD is not entirely reliable and so this approach can lead to some lesions or pathologies being missed, resulting in reduced reliability. Alternatively, incorrectly identifying a feature of a body part as being a lesion or pathology results in wasted time.

Hence, it would be advantageous to be able to increase the speed, reliability and efficiency with which 3d medical imaging data sets can be visualized for inspection.

According to a first aspect of the present invention, there is provided a computer implemented method for creating a viewing protocol for medical images relating to a patient. The existence of a site or region of interest in a medical imaging data set captured from the patient can be determined. A viewing protocol for displaying medical images to a user is planned. The viewing protocol can include a viewing path which will display an including the site of interest. The viewing protocol can also include a trigger associated with the site of interest. The trigger can cause the dynamic mode of image display to be reconfigured to highlight display of the first site of interest.

Hence, by using auxiliary information relating to entities in the imaging data set, the dynamic way in which the viewing protocol is presenting images can be configured or otherwise adapted so as to enhance the way in which images of the entities are displayed so as to make it easier to inspect images of the entities. In this way, reliable inspection of the entire data set is facilitated by identifying regions of special interest and then dynamically presenting images of the regions of special attention in a dynamic manner which allows them to be more rigorously and completely inspected.

The method can include determining the existence of a plurality of sites of interest. That is, more than one entity in the captured image data set can be identified for enhanced display.

The viewing protocol can include a plurality of triggers, each associated with a respective site of interest. That is, a separate trigger can be provided in the viewing protocol for each site or region of interest such that a particular dynamic display modality can be chosen for each site. For example, although the same type of dynamic display modality can be used, e.g. zooming in to magnify an entity, attributes of that type of display modality can be varied, e.g. the rate at which the zooming occurs or to what level of magnification. Alternatively a single trigger can be used to determine both the type of the dynamic display modality and the attributes of the dynamic display modality.

The dynamic mode of image display can be reconfigured in at least two different ways. That is at least two, or more, different types of dynamic image display modalities can be triggered in the viewing protocol, either for the same or for different triggers. For example, a first trigger could cause a first site to be displayed animated with a different direction of view and a second trigger could cause a different site to be displayed animated at a different resolution or magnification. Alternatively, a single trigger could cause the same site to be displayed with both a different direction of view and at a different resolution. Alternatively, a single trigger could cause the site to be displayed in a particular dynamic display modality and including a reconfigured static display modality, e.g. changing the colour or other aspect, or aspects, of the visual appearance of the site. Other combinations of dynamic and static display modalities can be used for any single trigger and/or multiple triggers and/or for a site and/or for multiple sites.

Determining the existence of a site of interest can include accessing an electronic patient record. Patient record data can be used to determine the existence of the site of interest. Patient record data can also be used for purposes other than simply identifying the existence of the site. For example, the patient record data can be used to determine the type and/or attributes of the dynamic display modality, and the type and/or attributes of any static display modalities, to be used for the site.

Determining the existence of a site of interest can include using computer assisted detection (CAD). A computer assisted detection algorithm can be applied to the medical imaging data set to identify sites of interest. Hence, the image data set can be analysed so as to identify sites of interest within the whole of the image data for which the dynamic display modality should be reconfigured. In this way the method automates the selection of sites to be inspected by a user but without making a simple binary assessment of the relevance of the site. Rather, the information is used to cause a dynamic display modality to be selected which is more appropriate for a rigorous inspection of an image including the site.

Auxiliary information can be used to determine the type and/or an attribute of the dynamic display modality, or any static display modality. For example, if CAD data, or patient data, indicates that it is uncertain whether a site is an actual lesion, then the rate at which images including that site are displayed can be decreased, making it easier to more accurately assess from the displayed images whether the site is likely a lesion. Hence, a metric obtained from the CAD or patient data can be used to select the type of dynamic display modality and/or to set or adjust an attribute of the dynamic display modality. A metric obtained from auxiliary data can also be used to determine the type and/or an attribute of a static display modality being used with the dynamic display modality.

The or each site of interest can correspond to a potential or actual lesion or pathology. That is, each site of interest can be a known lesion, pathology, or other abnormal entity, or a site that is considered or suspected of being a lesion, pathology or other abnormal entity. Hence the method allows a more rigorous inspection of potential harmful conditions.

The or each site can correspond to a particular anatomical feature or entity which it is desired to inspect, or a site at which a lesion or pathology was previously present, but which has been treated. Hence, the invention provides a viewing protocol which can be used to more accurately assess the normal health or the efficacy of a treatment.

A number of dynamic image display modalities can be used in reconfiguring the mode of image display to highlight the site of interest. The type of dynamic viewing modality can be changed. For any particular dynamic viewing modality, an attribute or parameter of that dynamic viewing modality may be changed.

The time for which an image is displayed can be altered. For example, a rendering including the site or a part of the site can be displayed for a longer time than renderings not including the site.

The rate at which images are displayed can be changed. For example renderings in which the site is not shown can be displayed in rapid succession, whereas renderings including the site or a part of the site can be displayed in less rapid succession.

The magnification of at least a part of the image can be changed. For example, that part of a rendering corresponding to the site or a part of the site may be dynamically displayed at greater levels of magnification.

The resolution of at least a part of the image can be changed. For example, that part of a rendering corresponding to the site or a part of the site may be dynamically displayed at greater levels of resolution. Further, renderings not including the site can be displayed at a lower level of resolution than renderings including at least a part of the site. Hence, less processing power is required to display the less important images and so the overall processing time is reduced.

Static display modalities can also be reconfigured by the trigger. For example, the colour of at least a part of the image can be displayed. For example, the site or parts of the site can be displayed in a different colour to surrounding parts. Any visual aspect of the site or part of the site, such as its texture, can also be changed so as to visually highlight the site.

The direction of view of the image can be changed. For example, the direction of view can be altered from along the viewing path to more directly toward the site of interest.

The image may be viewed from a plurality of different angles. For example, progress along the trajectory of the viewing path may be stopped and the site may be displayed from a number of different directions so as to provide a better overall view of the site. Any combination of these dynamic viewing modalities can also be used.

The trigger can make the displayed site of interest an active entity with which a user can interact by entering a command. Hence, when images are subsequently displayed according to the viewing protocol, the user can interact with the displayed site. For example, a user could enter a command to initiate another action in relation to the site, such as a user selected change of display modality (e.g. zooming in), or a user can enter data relating to the site, for example annotating the image.

The trigger event can start a macro which carries out a display routine for the site of interest. The display routine can include any one of or combination of the display modalities mentioned above, as well as other types. The macro can start a display routine specific to the site. For example, different sites may have different display routines. For example, if the site is considered likely to be a stenosis, then a macro which carries out a display routine panning the view 360 degrees around the stenosis may be carried out. In this way a display routine most apt for allowing the site to be inspected can be carried out.

The method can further comprise displaying a plurality of medical images according to the viewing protocol created. The displayed images, or renderings, can help a practitioner viewing the images to make a diagnosis or the patient.

The method can further comprise receiving a command from a user during display of the medical images and executing an action in response to the command. A command can be entered by selecting an active site as described above. Alternatively, or additionally, the method may simply receive a command from an input device and carry out a selected action, such as a user selected change in the type or attribute of a display modality.

According to a further aspect of the invention, there is provided a data processing device for creating a viewing protocol for medical images relating to a patient. The device can comprise a data processor in communication with a memory storing instructions. The instructions can configure the data processor. The data processor can determine the existence of a site of interest in a medical imaging data set. The data processor can also plan a viewing protocol for displaying medical images to a user. The viewing protocol can include a viewing path displaying an image of said site of interest. The viewing protocol can also include a trigger associated with the site of interest. The trigger can cause the dynamic mode of image display to be reconfigured to dynamically highlight the first site of interest.

Preferred features of the data processing device aspect of the invention correspond to counterparts to the preferred features of the method aspect of the invention described above.

According to a further aspect of the invention, there is provided computer program code executable by a data processor to provide the method aspect of the invention or the data processing device aspect of the invention. The invention also provides a computer program product comprising a computer readable medium bearing the computer program code aspect of the invention.

An embodiment of the invention will now be described, by way of example only, and with reference to the accompanying drawings, in which.

Figure 1:
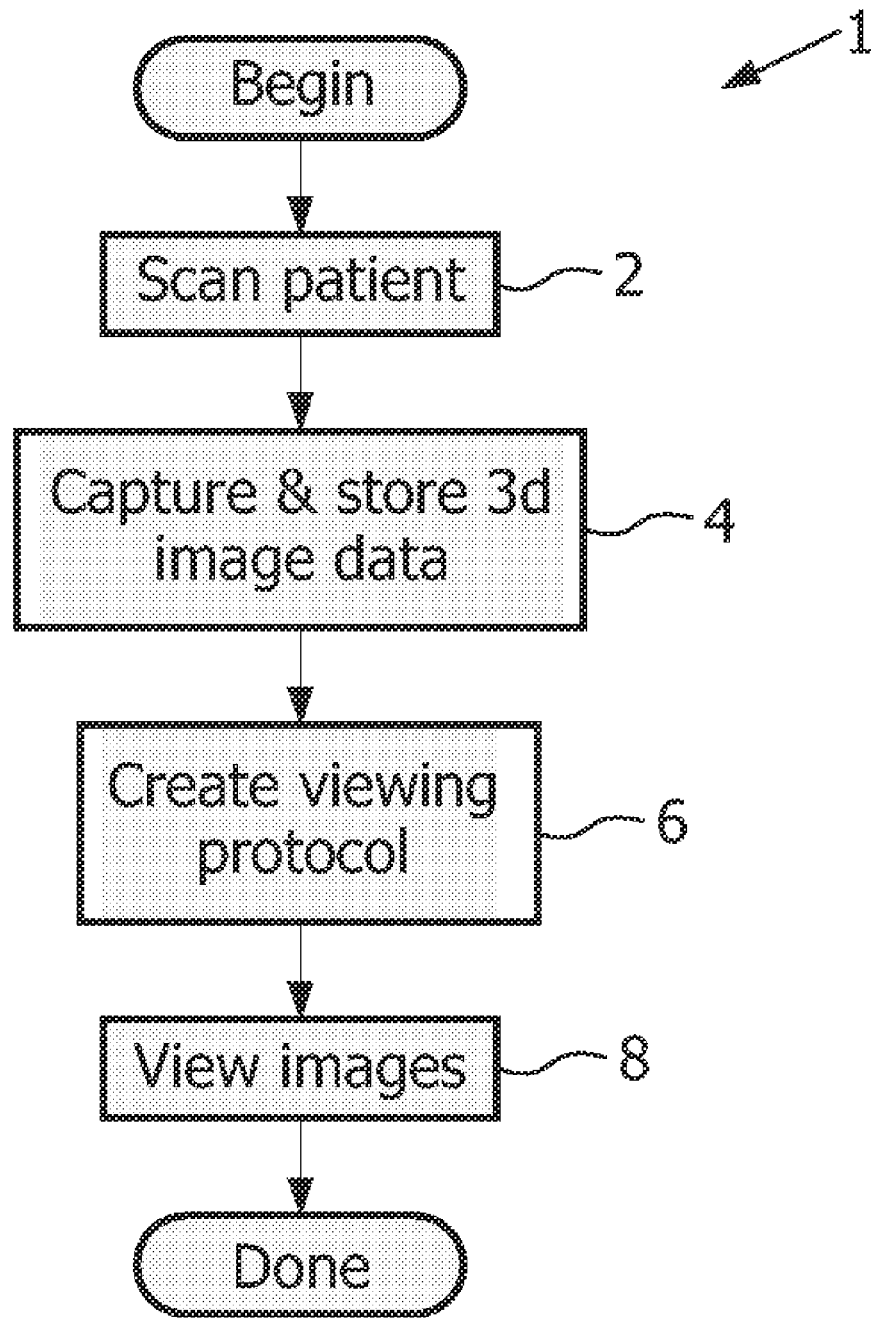
FIG. 1 shows a flow chart illustrating a method for viewing medical images of a patient.

Similar items in different Figures share common reference numerals unless indicated otherwise.

An embodiment of the invention will now be described in the context of an MR image data set and virtual colonoscopy. However, it will be appreciated that the present invention is not limited to such data sets, nor to colonoscopy. In particular, the invention can be applied to 3D data sets captured by other imaging modalities, such as CT scanners and in other medical applications, such as investigation lung nodules, colon polyps, neuro aneurysms or stenosis.

With reference to FIG. 1, there is shown a flowchart illustrating at a high level, a medical image viewing method 1 in which the present invention can be used. The method begins with scanning a patient 2 using a suitable scanning system in order to capture a plurality of sections through the body of the patient.

Figure 2:
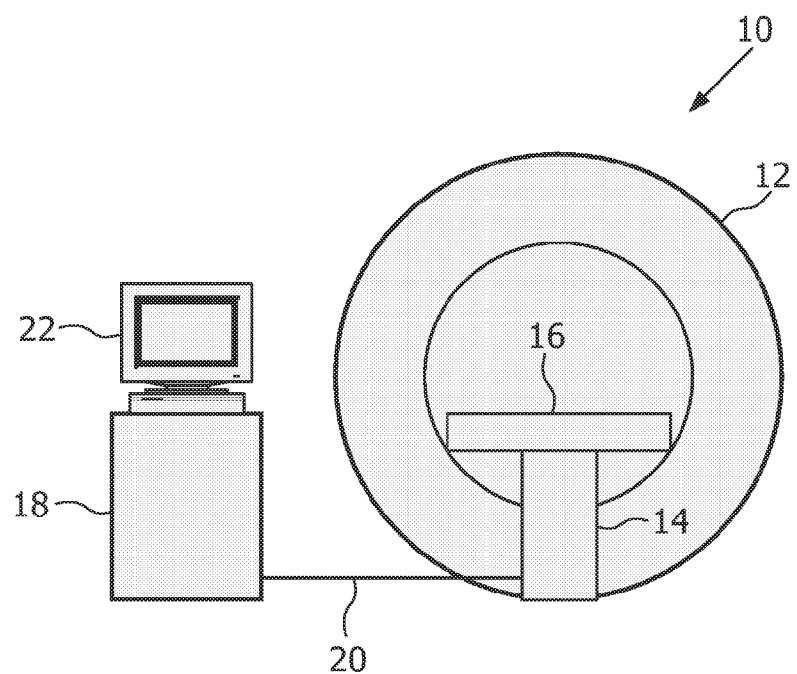
FIG. 2 shows a schematic block diagram of an image capturing system including data processing apparatus according to the invention.

With reference to FIG. 2 there is shown a schematic diagram of an imaging system 10, which in this exemplary embodiment, is an MRI scanner. The system includes a housing 12 including an electromagnet for generating magnetic fields in a bore of the housing as is well known in the art. A support 14 bears a table 16 on which a patient can be positioned and manoeuvred within the bore of the scanner. A cabinet 18 houses various control and data capture electronics and is in communication with the scanner itself via communication line 20. It will be appreciated that some of the control and data capture electronics can be included in the scanner itself. System 10 includes a computer 22 having a display unit via which a user can control operation of the scanner and carry out various data processing activities on the images captured by the scanner.

Figure 3:
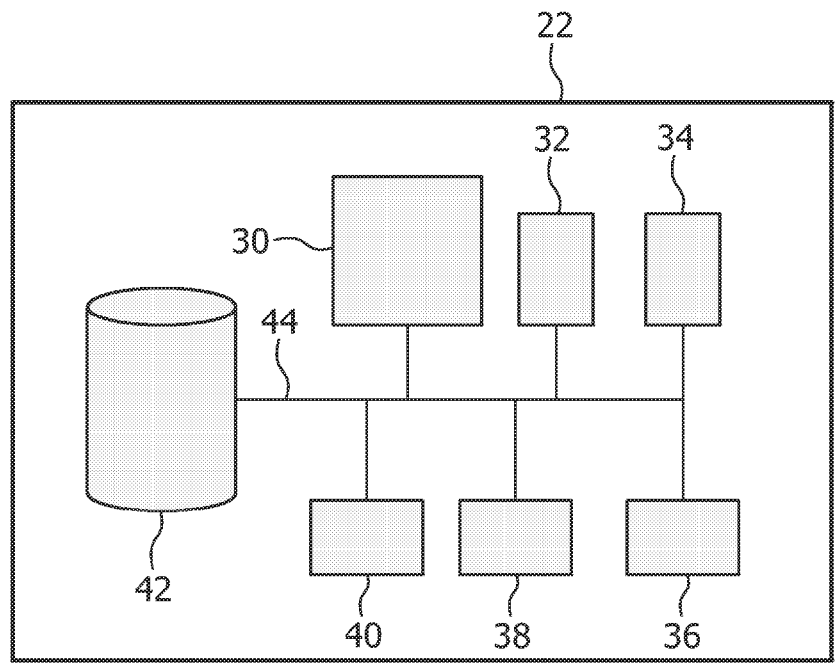
FIG. 3 shows a schematic block diagram of the data processing apparatus of FIG. 2.

FIG. 3 shows a schematic block diagram of computer 22. Computer 22 includes a processor or processors 30 and a random access memory (RAM) 32 and a read only memory (ROM) 34. As is well known in the art, ROM 34 can permanently store instructions and data and RAM 32 can be used as a working memory by processor 30 to store data and instructions relating to operations currently being executed by processor 30. Computer 22 also includes I/O circuitry 36 by which the computer communicates with various input and output devices, such as a display unit, keyboard, mouse and other peripheral devices. Computer 22 also includes a communications board 38 via which the computer can communicate with other devices and computers locally or over a network, such as a local area network (LAN) or a wide area network (WAN). Computer 22 can also include a removable mass storage device 40, such as a floppy disc drive or a CD-Rom drive. The removable data storage medium can be used to transfer data and/or programs to and from the computer 22. Computer 22 can also include a mass storage device 42, such as a hard disc drive, which can store programs and data required by the computer system, such as an operating system and applications for controlling operation of the scanner and image handling and processing. Data files representing captured images can also be stored on mass storage device 42, or remotely, e.g. on a networked storage device. The various parts of the computer are connected by a bus 44 over which control signals, instructions and data can be passed between the parts of the computer.

In one embodiment, the present invention is provided as an application running on computer 22 to create a viewing protocol for viewing images derived from images captured by imaging system 10. However the invention does not need to be provided locally to the imaging system and in other embodiments, the invention is not provided as a part of the imaging system but rather is provided on a separate unit, such as a dedicated viewing system, which has local or remote access to the 3d image data captured by the scanner.

Returning to FIG. 1, at step 4, the image data generated by the imaging system 10 is captured and stored in a suitable format and provides a 3D data set from which medical images of the patient's body parts can be generated. Then at step 6, a viewing protocol for displaying a sequence of images of the patient's body part is created using the method of the invention. As indicated above, the viewing protocol can be created using a software application running on computer 22 or on a different computer having access to the 3D data set. The 3D data set can be transferred from the computer 22 over a network, or remotely accessed over a network, to a separate dedicated viewing station. The data processing operations involved in creating the viewing protocol will be described in greater detail below with reference to FIG. 4.

After the viewing protocol has been created in step 6, then at step 8, the viewing protocol can be used by a medical practitioner in order to inspect the images of the patient's body parts, which can allow a diagnosis to be made. As will be described in greater detail below, the viewing protocol created at step 6 uses auxiliary information in order to configure dynamic aspects of the viewing protocol such that the images dynamically displayed to the practitioner facilitate inspection of the images to improve the ability of the practitioner to assess the images. The data processing operations involved in viewing the images will also be described in greater detail below with reference to FIG. 4.

Figure 4:
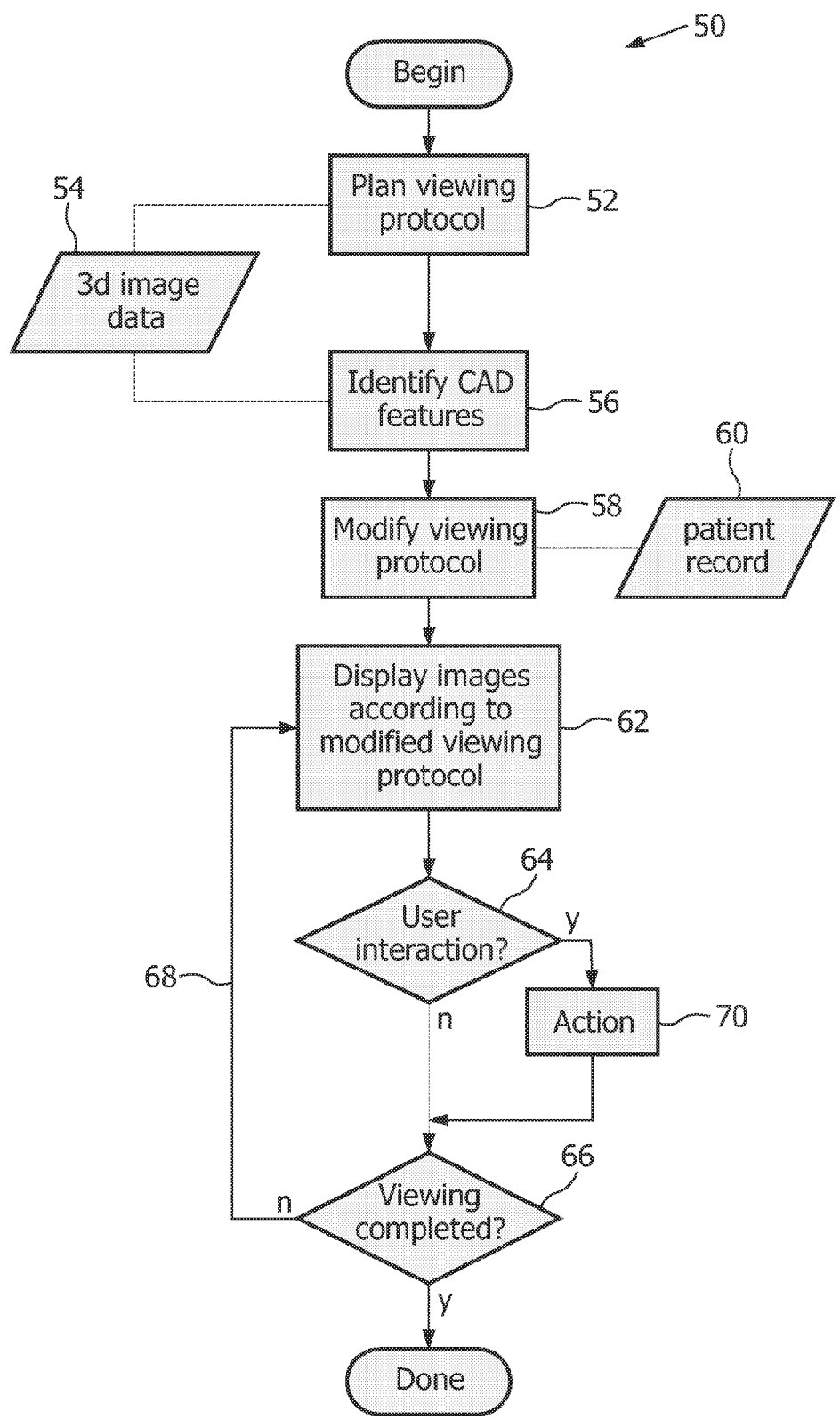
FIG. 4 shows a process flow chart of a computer implemented method for viewing medical images according to the invention.

FIG. 4 shows a process flowchart illustrating a computer implemented method 50 for creating a viewing protocol and displaying medical images according to that viewing protocol. At step 52, an initial viewing protocol is defined using the 3D data set 54 and a defined application or target pathology. Defining the initial viewing protocol includes determining a viewing path, or trajectory, together with a viewing direction determining the image to be displayed as the viewing path is traversed. Planning of the initial viewing protocol also includes defining certain rendering parameters which specify the manner and format in which images are to be rendered from the 3D data set 54.

Geometrical information is extracted from the images in the data set (e.g. location of organs etc) or from associated meta information. The geometrical information, and/or associated meta information, is used to generate the viewing path which can be adapted to take into consideration the anatomy. For example, in the case of a virtual colonoscopy, the viewing path follows the colon. Methods for determining a viewing path are known generally in the art, such as the method described supra. Such methods typically includes determining a start and end point of the colon either automatically or using interactive input from a user. Then a threshold is used to segment the colon to extract an approximate centre line. In the case of neuro CTA, the viewing path should be roughly aligned with orientation, location and the size of the head in the image.

The initial viewing protocol can also define different types of renderings (e.g. MPR (slab) MIP, surface renderings, DVR) to be used to display the body part images as the viewing path is traversed. The viewing protocol can also determine the sequence of renderings to be shown, whether two different types of renderings are to be shown and the time for which individual renderings are to be shown. In general, the initial viewing protocol should ensure that the captured 3D data set is sufficiently completely displayed for the purpose of the particular application of the method.

Then at step 56, or alternatively in parallel with step 52, features of interest in the 3D data set 54 are identified using computer assisted detection (CAD) methods. In particular, a CAD algorithm extracts a set of regions from the 3D data set 54 which appear likely to be potential lesions or pathologies, such as a colon polyp, in the present exemplary application. However, in other applications, the suspected or potential lesion or pathology may be a lung nodule, a stenosis or an aneurysm. Alternatively, or additionally, at step 56 a likelihood for a particular pathology existing can be assigned to individual voxels or regions in the image at step 56. Further, the CAD algorithms or methods can extract geometrical information from the 3D data set for likely pathologies, e.g. the size, shape or orientation of polyp, nodule, aneurysm or the axis of a stenotic vessel segment.

Then at step 58, information from the CAD step 56 is used to modify the initial viewing protocol generated at step 52. Dynamic aspects of the initial viewing protocol can be modified in a wide variety of ways so as to facilitate inspection of potential lesions or pathologies subsequently. Triggers are added to the viewing protocol which can subsequently cause the dynamic display modality to be reconfigured in a manner determined or indicated by the trigger.

For example the initial viewing protocol can be modified or adapted so as to alter the time for which a specific rendering is shown. For example if the CAD information indicates that the likelihood of a lesion being presented in a particular rendering is low, then that particular rendering is shown for a shorter period of time, compared to the period of time used when the CAD information indicates a high likelihood of a lesion being present or an ambiguous situation requiring more detailed inspection.

Also, the viewing parameters can be altered, depending on the CAD information, in order to change the dynamic manner in which images are presented. For example, the direction of view can be altered so that more of the potential lesion will be displayed to the viewer. That is, the viewpoint can be changed to a more optimal viewpoint for dynamically displaying the image of the lesion. Also, the magnification with which the lesion or lesion region is displayed can be dynamically changed compared to that of the remainder of the body part. Hence the lesion can be inspected in greater detail. Further, the rendering parameters can also be altered, dependent on the CAD information. For instance the rendering mode can be changed, the illumination level used during displaying on screen (i.e. how image values are mapped to the brightness values used for display on the screen) and the transparency and opacity for DVR rendering can be adjusted depending on the CAD information.

Also, a particular macro action can be inserted into the viewing protocol dependent on the CAD information. For example if the CAD information indicates that there is a potential lesion or a highly ambiguous area, than a macro can be called to display that area from a variety of different angles, e.g. for a possible stenosis, a 360" rotation may be shown to visualise the vessel segment from all sides. Other kinds of macro actions can also be used, such as 'flying-through' a vessel segment in which the displayed view corresponds to passing through the feature of interest, and showing a view from inside the feature of interest, e.g. inside a vessel looking out.

The viewing protocol can also be modified to include interactive elements based on the CAD information. For example when a potential lesion is displayed to a viewer, the lesion can be made interactive such that if a user selects the displayed lesion, e.g. by "clicking" on the lesion using a mouse, then a further action can be initiated. For example a macro action could be called to view the lesion from different directions, the magnification of the view of the lesion can be changed or further information relating to the potential lesion can be displayed to the user.

At some stage during the modification of the initial viewing protocol, it can be determined whether each of the individual renderings defined by the initial viewing protocol includes regions for which the CAD information indicates that a dynamic aspect of the viewing protocol should be modified to facilitate viewing of the potential lesion. This can be achieved in a number of different ways. For example for a specific rendering, the number of voxels identified by the CAD algorithm as contributing to the potential lesion can be calculated so as to determine whether that particular rendering may be a rendering requiring enhanced inspection. In another approach, if a stack of image slices are to be sequentially displayed, then for each of the slices to be displayed, a measure of the likelihood of a lesion in that slice can be integrated over the slice and can be used in calculating a time for which each respective slice is shown. Hence if the integrated likelihood for a slice is low then that slice can be displayed for a relatively shorter period of time than a slice for which the integrated likelihood is high, thereby allowing greater inspection of the slice most likely to show the presence of a lesion.

In a virtual endoscopy application, a ray casting method can be used to check whether voxels near to the points, or regions, of interest contribute to the rendering, so as to determine whether that rendering requires enhanced display to a user. In another method, for those portions of the viewing path or trajectory which are closest to interesting points or regions, a slower speed of traverse along the viewing or trajectory path can be used, compared with the other parts of the viewing path. Hence, those renderings including images of interest are displayed for a greater amount of time than those renderings not considered to include images of interest.

The initial viewing protocol may also be modified based on medical information derived from sources other than the CAD information. For example an electronic patient record 60 may include data items relating to patient related information, such as age, clinical history, specific risks and other medical information. The medical information data items obtained from the electronic patient record 60 may be accessed by the program to modify the initial viewing protocol at step 58. For example if the patient's information or clinical history indicates an increased risk of having a pathology in a specific area then the viewing protocol may be modified to focus attention on that particular area.

Alternatively, or in addition, information relating to a prior diagnosis or treatments can be obtained from the electronic patient record 60 and used to modify the viewing protocol to focus attention on a particular region at which a lesion has previously been diagnosed or treated so as to assess the current status of the lesion. This information can also be used when different imaging modalities have been used. For example a first imaging modality may have indicated a potential lesion at a particular location. A second imaging modality may then be used to collect a 3D data set and the viewing protocol for that second 3D data set may then be modified to focus attention on the same region to determine whether the potential lesion is also identified by the second imaging modality. Alternatively, or additionally, the patient information record can be used to assess the effectiveness of a prior treatment in follow up studies.

Information from the CAD or patient record can also be used as auxiliary information to add or alter a static visual property of features being displayed in the images. For, example, a potential lesion, or site of an earlier lesion, may be displayed in a different colour and the intensity or brightness of that colour may be dependent on the auxiliary information. A potential lesion of high uncertainty may be display more vividly than other potential lesions so as to emphasis that the lesion requires more rigorous inspection by a user.

After the modified viewing protocol has been created then the viewing protocol may be used to display images to a user for assessment. The display of images may be carried out immediately after the modified viewing protocol has been created or may be carried out after a delay. Further, the display of images may be carried out on a computer different to that on which the modified viewing protocol was created.

Figure 5:
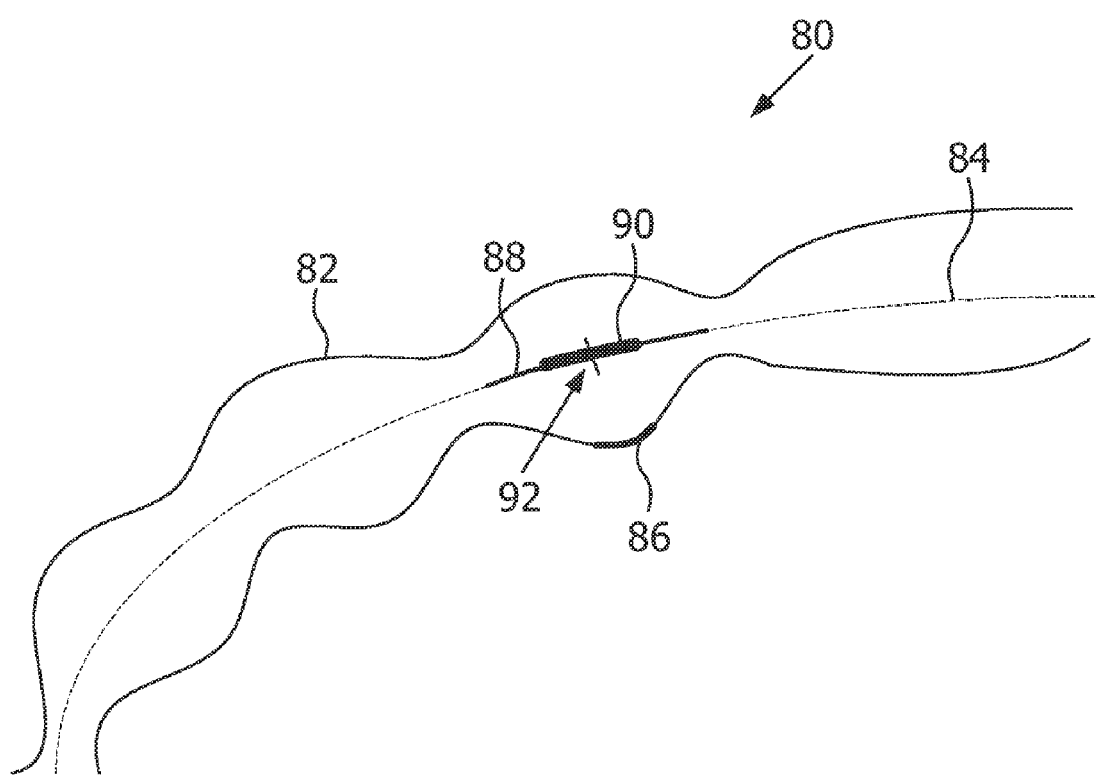
FIG. 5 shows a schematic representation of a body structure having a lesion illustrating the image viewing and display parts of the methods shown in FIGS. 1 and 4 respectively.

Continuing with the example of a virtual colonoscopy, FIG. 5 shows a schematic representation illustrating a virtual colonoscopy 80 being viewed by a user clinician at step 8 of the general method 1. FIG. 5 shows a longitudinal cross section through a segment of a virtual colon 82 which can be generated from the 3D data set 54. Dashed line 84 illustrates a viewing path defined by the viewing protocol. Region 86 of the colon wall represents an interesting region or area as identified by the CAD algorithm at step 56. Bold line 88 represents those points on the viewing path at which the region of interest 86 will be within a default field of view for each rendering for each of the points on the viewing path. Thickened line 90 illustrates a region along the viewing path having reduced speed, that is for which each rendering is displayed for a longer period of time so that the viewer can inspect the images more carefully. Bar 92 illustrates a point in the viewing path at which a macro action is called during the modified viewing protocol.

Returning to FIG. 4, at step 62, a sequence of rendered images is displayed according to the modified viewing protocol for each step along the viewing path 84, giving the appearance of a virtual endoscopy. At step 64 it can be determined whether a user has entered any commands and if not processing can proceed to step 66 at which it is determined whether the viewing protocol has completed. If not, then process flow returns as illustrated by line 68 and the next rendered image is displayed in accordance with the modified viewing protocol. Processing can continue to loop in this way until it is determined at step 66 that the viewing protocol has completed in which case the process can terminate.

With reference to FIG. 5, the modified viewing protocol indicates that there are no regions of particular interest along the viewing path 84 and so the rendered images are displayed at a constant rate as defined by the viewing protocol. However, once the viewing path enters region 88, the rendered images start to display the potential lesion 86, and the part of the image including the potential lesion may be displayed with an increased magnification or increased resolution. Once region 90 of the viewing path is entered, the modified viewing protocol results in each rendered image being displayed for a greater period of time thereby resulting in effective slowing of the speed along which the viewing path is traversed. Once point 92 of the viewing path is reached, a macro action is automatically executed. For example the direction of view may be directed entirely at the potential lesion, rather than along the viewing path and additionally, or alternatively, the direction of view may be changed to allow a more thorough inspection of the potential lesion region before proceeding further along the viewing path.

Once the potential lesion 86 is displayed, the user may enter a command, for example by clicking on the lesion part of the displayed image. At step 64 this user interaction is identified and the action selected by the user entry is carried out at step 70. For example, clicking on the displayed lesion may result in a magnified image of the lesion being displayed or may result in a different view of the potential lesion region being displayed to the user.

In one embodiment, the user may be allowed to enter a command allowing an annotation of the image to be entered. Hence by clicking on the displayed image of the potential lesion, a dialogue box can be presented to a user allowing them to enter a text annotation commenting on the displayed potential lesion. In some embodiments, if the likelihood of the potential lesion being a genuine lesion is sufficiently high, further traversal along the viewing path may be prevented until the user has entered a comment, in that way ensuring that all potential lesions are actively inspected by the user, rather than the user being allowed to simply ignore the presence of the potential lesion. For example, in the case of a colon polyp detected with a high probability at CAD stage 56, the automatic continuous display by the viewing protocol may be interrupted and only continued after an annotation has been inserted. Alternatively, the user action may allow a specific macro action to be initiated, as described above.

The present invention also relates to a device, system or apparatus for performing the afore-mentioned operations. This system may be specially constructed for the required purposes or it may be a general purpose computer selectively activated or configured by a computer program stored in the computer. The processes presented above are not inherently related to any particular computer or other computing apparatus. In particular, various general purposes computers may be used with programs written in accordance with the teachings herein, or alternatively, it may be more convenient to construct a more specialised computer system to perform the required operations.

In addition, embodiments of the present invention further relate to computer program code and computer program products including a computer readable medium that bears program code for performing various computer implemented operations. The computer readable medium can be considered to be any data storage device or mechanism that can store data which can thereafter be read by a computer system. The media and program code may be specially designed and constructed for the purposes of the present invention, or they may be of the kind well known to those of ordinary skill in the computer software arts. Examples of computer readable media include, but are not limited to: magnetic media such as hard discs, floppy discs, and magnetic tapes; optical media such as CD-Rom discs; magneto-optical media such as floptical discs; and specially configured hardware devices, such as application specific integrated circuits (ASICs), programmable logic devices (PLDs) and ROM and RAM devices. The computer-readable medium can also be provided as a data signal embodied in a carrier wave and/or distributed over a network of coupled computer systems so that the computer-readable code is stored and executed in a distributed fashion or made available from a remote location. Examples of program code include both machine code, as produced, for example, by a compiler, or files containing high level code that may be executed using an interpreter.

Although the foregoing invention has been described in some detail for purposes of clarity of understanding, it will be apparent that certain changes and modifications may be practised within the scope of the appended claims. Furthermore, it should be noted that there are alternative ways of implementing both the process and apparatus of the present invention. In particular, unless the context requires otherwise, the flowcharts are by way of illustration only and are not necessarily intended to limit the invention to the specific operations depicted or the depicted sequence. For example some operations can be divided into sub-operations or can be combined. Further, unless the context of the invention requires otherwise, the order of carrying out the operations need not be important. Accordingly, the present embodiments are to be considered as illustrative and not restrictive and the invention is not to be limited to the details given herein but may be modified.

The invention claimed is:

1. A computer implemented method for creating a viewing protocol for medical images relating to a patient, comprising:
    determining (2, 4) the existence of at least a first site of interest (86) in a medical imaging data set captured from the patient; and
    planning (6, 52) a viewing protocol (88) for displaying medical images to a user, said viewing protocol including a viewing path which can display an image of a part of said first site of interest, wherein the viewing protocol (88) also includes at least a first trigger associated with the first site of interest (86) which can cause the dynamic mode of image display to be reconfigured (58) to dynamically highlight display (62) of the part of the first site of interest (86).

2. The method as claimed in claim 1, wherein the existence of a plurality of sites of interest is determined and the viewing protocol includes a plurality of triggers, each associated with a respective site of interest, and the dynamic mode of image display being reconfigured at least twice.

3. The method as claimed in claim 1, wherein determining the existence of the site of interest includes accessing an electronic patient record and using patient record data to determine the existence of the site of interest.

4. The method as claimed in claim 1, wherein determining the existence of the site of interest includes applying a computer assisted detection algorithm to the medical imaging data set to identify the site of interest.

5. The method of claim 1, wherein the site of interest corresponds to a potential or actual lesion or pathology.

6. The method of claim 1, wherein reconfiguring the dynamic mode of image display to highlight the site of interest, is selected from one, or a combination of: changing the time for which an image is displayed; changing the rate at which images are displayed; changing the magnification of at least a part of the image; changing the resolution of at least a part of the image; changing the direction of view of the image; and viewing the image from a plurality of different angles.

7. The method as claimed in claim 1, wherein the trigger makes the displayed site of interest an active entity with which a user can interact by entering a command.

8. The method as claimed in claim 1, wherein the trigger starts a macro which carries out a display routine for the site of interest.

9. The method of claim 1, further comprising:
    displaying a plurality of medical images according to the viewing protocol created.

10. A data processing device (22) for creating a viewing protocol for medical images relating to a patient, the device comprising:
    a memory (34) storing instructions storing a medical imaging data set captured from the patient;
    a data processor (30) designed to determine the existence of at least a first site of interest in a medical imaging data set,
    characterized in that the data processor comprises instructions to plan a dynamic image display protocol for displaying medical images to a user, said dynamic image display protocol including a viewing path including an image of at least a part of said first site of interest, and the dynamic image display protocol also includes at least a first trigger associated with the first site of interest, causing the dynamic mode of image display to be reconfigured to dynamically highlight display of at least a part of the first site of interest.

11. A computer program product comprising a computer readable medium bearing computer executable instructions for carrying out the method as claimed in claim 1.

* * * * *